(12) United States Patent
Choi

(10) Patent No.: US 10,761,290 B2
(45) Date of Patent: Sep. 1, 2020

(54) VIRTUAL REALITY VIDEO DEVICE FOR EDUCATIONAL VIDEO MONITOR

(71) Applicant: Hae-Yong Choi, Seoul (KR)

(72) Inventor: Hae-Yong Choi, Seoul (KR)

( * ) Notice: Subject to any disclaimer, the term of this patent is extended or adjusted under 35 U.S.C. 154(b) by 0 days.

(21) Appl. No.: 16/590,529

(22) Filed: Oct. 2, 2019

(65) Prior Publication Data

US 2020/0110241 A1 Apr. 9, 2020

(30) Foreign Application Priority Data

Oct. 8, 2018 (KR) .......................... 10-2018-0119586
Sep. 16, 2019 (KR) .......................... 10-2019-0113374
Sep. 23, 2019 (KR) .......................... 10-2019-0116536

(51) Int. Cl.
*G02B 7/02* (2006.01)
*G02B 30/34* (2020.01)
*G09B 5/02* (2006.01)

(52) U.S. Cl.
CPC ............ *G02B 7/021* (2013.01); *G02B 30/34* (2020.01); *G09B 5/02* (2013.01)

(58) Field of Classification Search
CPC .... G02B 27/02; G02B 27/022; G02B 27/024; G02B 27/026; G02B 27/028; G02B 27/04
See application file for complete search history.

(56) References Cited

U.S. PATENT DOCUMENTS

| 514,789 A | * | 2/1894 | Pattberg | .................... E04H 1/04 |
| | | | | 52/236.4 |
| 1,059,868 A | * | 4/1913 | Harrison | ................ G02B 25/00 |
| | | | | 359/805 |
| 9,804,402 B2 | | 10/2017 | Choi | |

FOREIGN PATENT DOCUMENTS

JP 2004177431 A * 6/2004

* cited by examiner

*Primary Examiner* — Robert E. Tallman
(74) *Attorney, Agent, or Firm* — Bacon & Thomas, PLLC

(57) ABSTRACT

A virtual reality video device for educational video monitor that includes a video monitor to provide 3D videos and the 3D-based VR videos; a lens plate provided with left and right lenses having the same interval as the interval between human eyes on one side of the video monitor; a fixing board for coupling the lens plate to the video monitor; a horizontal support which is coupled to the fixing board and has the same length as the focal distance between the left and right lenses during use; a position adjustment device to adjust the vertical position of the lens plate by a vertical support and an inner vertical support, while allowing the lens plate and the horizontal support to move up and down; and a horizontally movable device installed to allow the lens plate, the horizontal support, and the position adjustment device to move horizontally.

8 Claims, 4 Drawing Sheets

FIG. 3
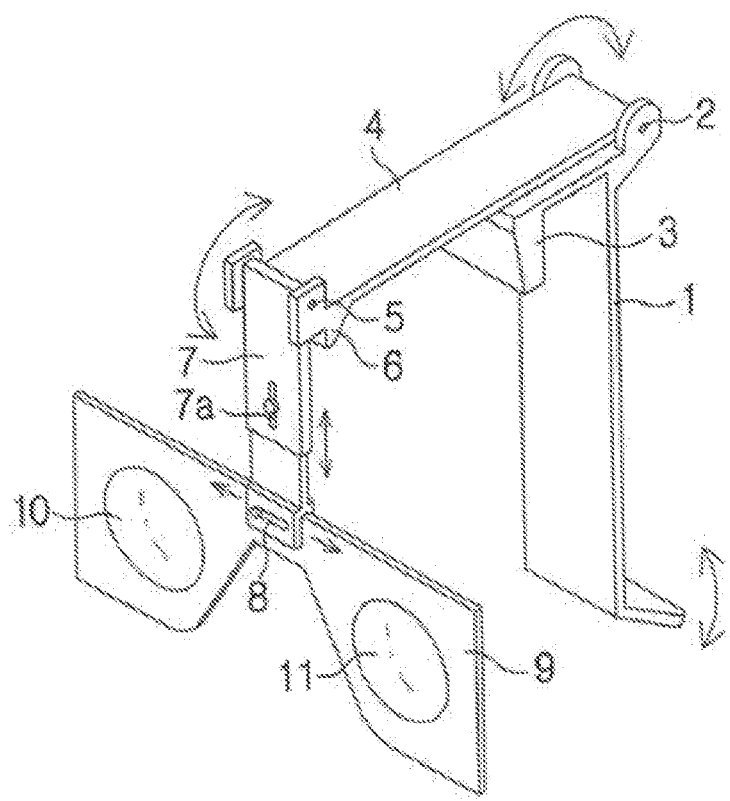
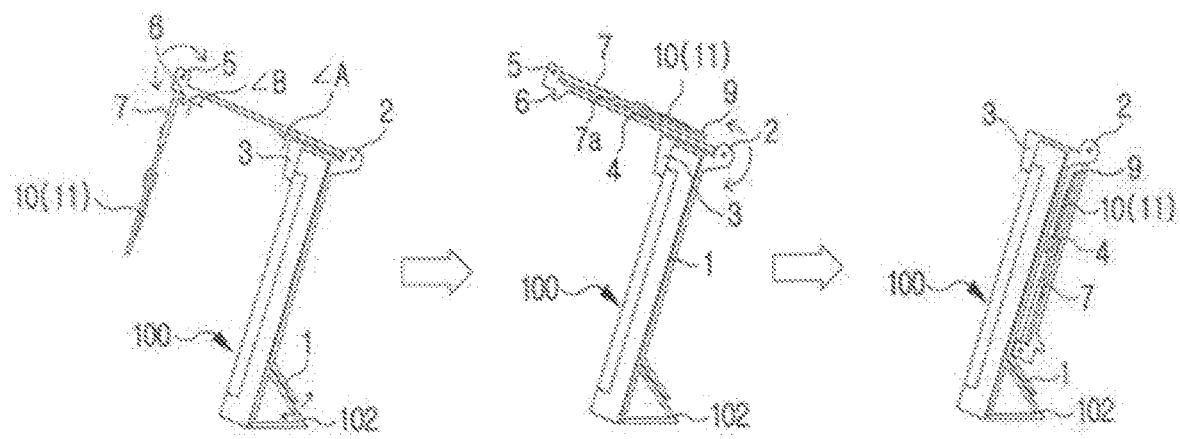
FIG. 4A     FIG. 4B     FIG. 4C

VIRTUAL REALITY VIDEO DEVICE FOR EDUCATIONAL VIDEO MONITOR

CROSS-REFERENCE TO RELATED APPLICATION

This application claims under 35 U.S.C. § 119(a) the benefit of Korean Patent Application Nos. 10-2018-0119586 filed on Oct. 8, 2018 and 10-2019-0113374 filed on Sep. 16, 2019, and 10-2019-0116536 filed on Sep. 23, 2019 the entire contents of which are incorporated herein by reference.

BACKGROUND

(a) Technical Field

The present invention relates to a virtual reality video device for educational video monitor that can be attached to the existing 2D video monitor with a screen size of diagonal 8" or larger to watch a three-dimensional (3D) image or a virtual reality (VR) video.

(b) Background Art

As elementary, middle, and high school textbooks are digitized, video monitors such as tablet PCs of 8" to 20" screen size based on screen size of diagonal 10" are distributed to students, instead of printed textbooks.

Recently, these video monitors are providing an additional application that allows users to view 2D image-based augmented reality videos in 3D image and VR video.

However, 3D videos and VR videos cannot be viewed on large size screens of 8" or larger with existing HMD or VR devices.

That is, in the case of 3D videos, the left eye image and the right eye image are combined with the left eye magnification lens and the right eye magnification lens into one image, so that the left eye image is viewed with the user's left-hand eye and the right eye image is viewed with the user's right-hand eye, thereby experiencing 3D videos due to the difference. However, screens larger than 8" are beyond the range of the difference.

That is, since the interval between the left and right pupils of a person is 65 mm, the interval between the central optical axes of the left and right lenses and the left and right 3D pictures also needs to be 65 mm, and thus the dimension of image needs to be within 130 mm×73 mm, which is twice the width size of 65 mm based on 16:9 aspect ratio.

In other words, the width size of a 3D screen for the left and right eyes cannot exceed 130 mm. For this reason, conventional VR videos and 3D videos mostly used 5.5" sized smart phones (screen size, width 130 mm×height 63 mm=diagonal 142 mm, area 8,190 $mm^2$).

However, educational video monitors used at schools are typically 10" video monitors (image size 200 mm×height 150 mm=diagonal 250 mm, area 30,000 $mm^2$ based on aspect ratio 4:3).

The screen size of 16:9 is width 218 mm×height 136 mm, diagonal 260 mm, and area 29,648 $mm^2$.

That is, the area of a 10" screen is about 3.66 times larger than a 5.5" screen.

Accordingly, in a screen of a video monitor larger than 10", the 3D screen or the VR screen 101 is partially displayed on uncertain positions such as the center, bottom, or corner of the screen as shown in FIG. 1.

Therefore, existing HMD or VR devices that do not correspond to the interval between the user's left and right pupils cannot be used for the educational video monitors larger than 8" that have a screen of width 65 mm×2=130 mm or more,

PRIOR ART DOCUMENT

Patent Document (Patent Document 1) U.S. Pat. No. 9,804,402

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention has been made in an effort to solve the above-described problems associated with prior art, and provides a foldable virtual reality display device.

It is an object of the present invention is to provide a means that allows the user to view 3D videos and VR videos on 8" to 20" sized tablet PCs and computer video monitors, which are larger screens than existing 5.5" sized smart phones, by improving U.S. Pat. No. 9,804,402 filed and registered by the applicant of the present application.

The VR video device for educational video monitor according to the present invention includes: a video monitor with a 8" or larger sized screen for providing 3D videos and the 3D-based VR videos; a lens plate provided with left and right lenses having the same interval as the interval between human eyes on one side of the video monitor; a fixing board for coupling the lens plate to the video monitor; a horizontal support which is coupled to the fixing board and has the same length as the focal distance between the left and right lenses during use; a position adjustment device to adjust the vertical position of the lens plate by a vertical support and an inner vertical support, while allowing the lens plate and the horizontal support to move up and down; and a horizontal movement adjusting device installed to allow the lens plate, the horizontal support, and the position adjustment device to move horizontally.

Each component described above is further provided with a hinge and a right angle holder, respectively, as necessary.

According to the present invention, the lens plate is unfolded on the front surface of the video monitor with 8" or more sized screen which exceeds the interval between human's pupils of 65 mm, so that the lens plate moves up and down by a vertical moving means, and moves to left and right by a horizontal moving means.

That is, even if VR videos and 3D videos are provided to any position of up, down, left, and right corners on the front surface of the video monitor, the lens plate moves up, down, left, and right by the horizontal support and the vertical support to move to a video position.

In addition, the length between the lens plate and the video monitor becomes equal to the focal distance between the left and right lenses by the horizontal support having the same length as the focal distance, and thus the focal point will be automatically equal to the length thereof without the need to adjust the focal distance of the lenses separately.

For example, the present invention as described above may provide dinosaurs, which has been educated with pictures on the dinosaur in digital textbooks, in 3D video for left and right eyes or in VR video on any one part of the video monitor, thereby increasing the educational effect.

Further, the present invention allows the user to view 3D and VR videos when used, and to conveniently store in a thin film form when pushed back by adding a hinge device installed at the horizontal support, the vertical support, and the fixing board, respectively.

In addition, the focal point of the left and right lenses may be stably maintained without shaking when the present invention is used, moved, or rotated to up, down, left, and right while mounted on a video monitor by a right angle holder which is provided at each of the horizontal support, the vertical support, and the fixing board.

That is, according to the present invention, it is possible to educate with 3D videos or 3D-based VR videos by simply attaching and detaching the left and right lens plate to the existing 2D video monitor of 8" or larger size as necessary while studying a 2D-based textbook process.

Therefore, in the VR video device for a video monitor of the present invention, it is possible to select and educate 2D, AR, 3D video, and 3D-based VR on 8" or larger sized video monitors at any time, and thus is easy to carry, store, and use.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein:

FIG. 3 is a perspective view showing main parts of the present invention.

FIG. 4A is a perspective view showing the operation sequence when present invention is used.

FIG. 4B is a perspective view showing a state that the lens plate is folded upward.

FIG. 4C is a perspective view showing a state that the lens plate and the horizontal support are folded in sequence.

Figure 1:
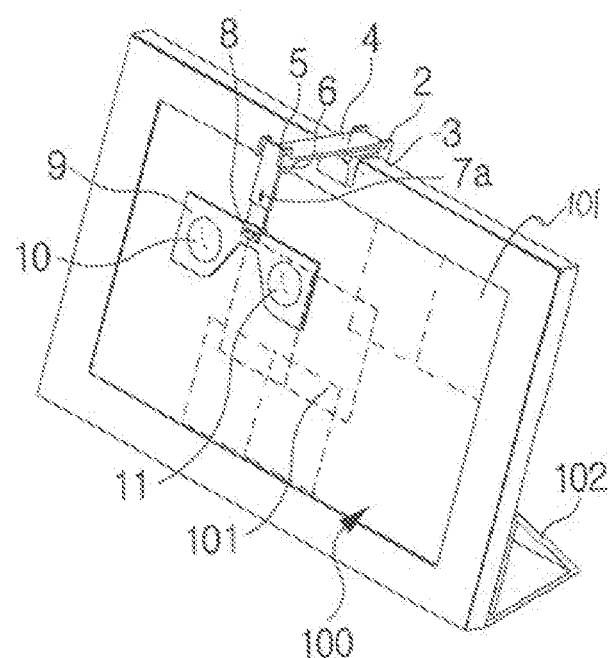
FIG. 1 is a perspective view of a virtual reality video device for educational video monitor according to the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, reference will now be made in detail to various embodiments of the present disclosure, examples of which are illustrated in the accompanying drawings and described below.

Figure 2:
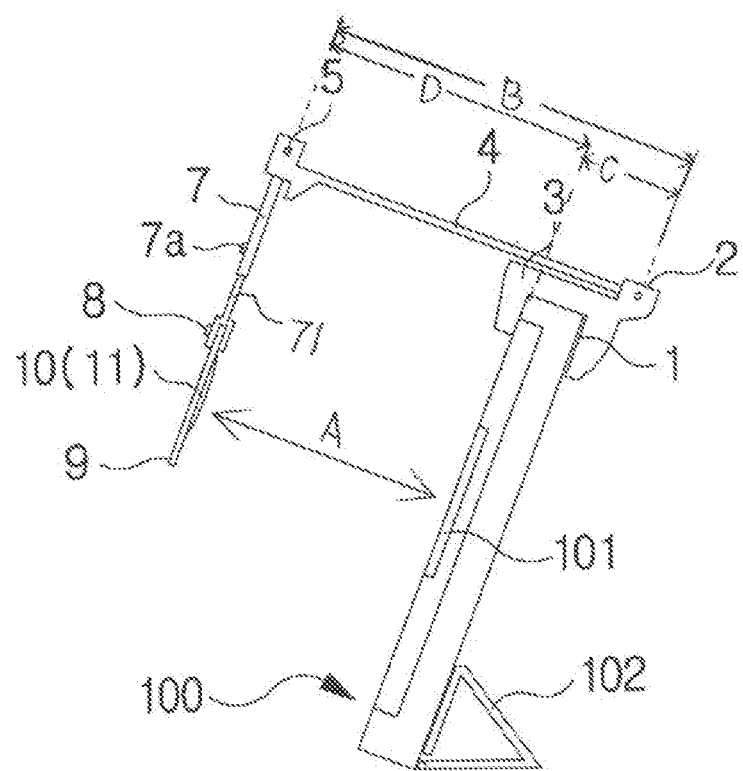
FIG. 2 is a perspective view showing a side configuration of FIG. 1.

According to the present invention as shown in FIGS. 1 to 3, a lens plate 9 is provided in a space which is spaced apart as much as a focal distance between the lenses in the forward direction from a 3D video and a 3D-based VR video 101 provided to a predetermined position or some different places on a video monitor 100 having a screen size of 8" to 20", so that the lens plate may move up, down, left, and right.

A video app (application) may be used to display the 3D left and right eye images on a part of the video monitor 100 by adjusting the interval between each center of the left and right eye images to an image size of width 63 to 65 mm.

Left and right lenses 10, 11 and the lens plate 9 are installed on the front space of the video monitor 100 in the forward direction from a screen displayed on any one part of the video monitor 100 as shown in FIGS. 1 to 4.

To move a horizontal support 4 and the lens plate 9 vertically, which are spaced apart as much as the focal distance between the left and right lenses 10, 11, all of a vertical support 7 provided at the front end of the horizontal support 4, an internal vertical support 7a which can be entered into the vertical support to extend its length, and the lens plate 9 provided at the lower end of the inner vertical support 7a are configured as one moving unit, and a fixing board 1 is provided to combine the moving unit to one side of the video monitor 100.

The vertical support 7 and the inner vertical support 7a are terms of the same concept.

In addition, a right angle holder 6 is additionally provided at each place or one place of between the vertical support 7 and the horizontal support 4 and between the horizontal support 4 and the fixing board 1, and a first and a second hinges 2, 5 are additionally provided at both ends or one end of between the horizontal support 4 and the fixing board 1 and between the vertical support 7 and the horizontal support 4.

Figure 5:
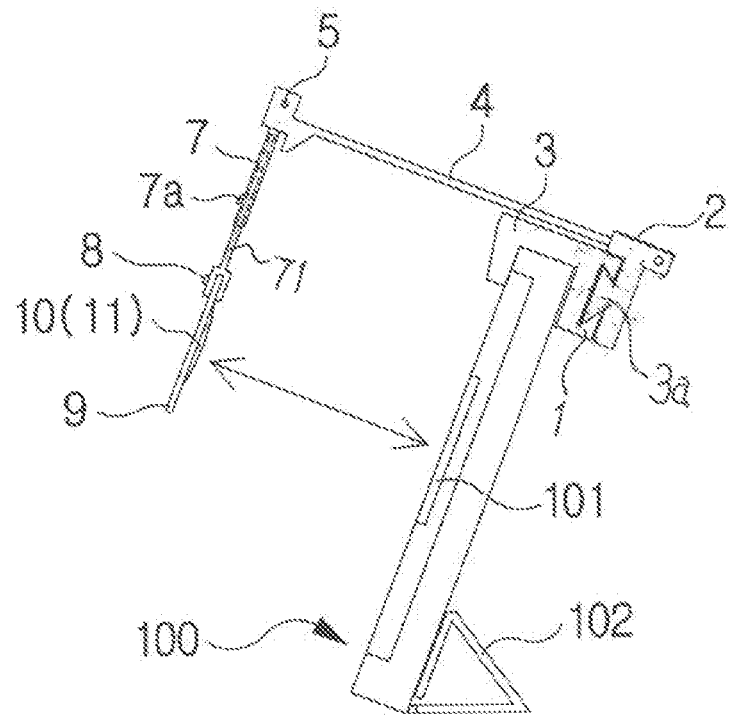
FIG. 5 is a perspective view showing the configuration of the horizontal moving structure.

As shown in FIG. 5, a horizontal moving means 3a is provided to be entered in the rear end of the fixing board 1, which extends in the horizontal direction. Such a structure allows the lens plate 9, which is connected to the horizontal support 4 provided with the horizontal moving means 3a and the vertical support 7, to move in the horizontal direction of the video monitor 100.

Figure 6:
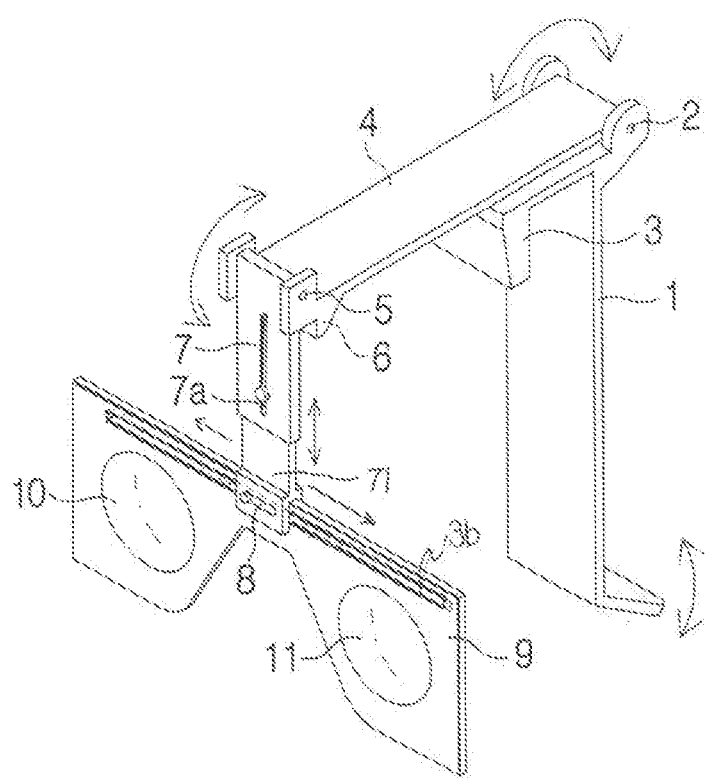
FIG. 6 is an explanatory view of an embodiment in which the horizontal moving structure is applied to the lens plate.

As shown in FIG. 6, a horizontal moving groove 3b for moving the lens plate 9 horizontally is provided in the lens plate 9 itself so that the lens plate 9 itself moves horizontally with respect to the vertical support 7.

The descriptions above will be described in detail based on the drawings.

As shown in FIG. 1, the present invention includes: a fixing means such as a fixing board 1 for combining the video monitor 100, on a part of which 3D left and right eye images are displayed, with the video monitor 100; a first rotating means such as a hinge 2 provided in the fixing means; a horizontal holding means such as the horizontal holder 3 provided in the fixing means; a horizontal support 4 connected to one side of the rotating means and rotating up to 270°; a second rotating means such as the second hinge 5 provided at the front end of the horizontal support 4; a right angle holding means such as a right angle holder 6 provided in the second rotating means; a vertical support 4 connected to the second rotating means and rotating up to 270°; and the lens plate 9 with the left and right lenses 10, 11 provided on the other side of the vertical support 4.

As shown in FIGS. 2, 3, 5, and 6, an inner vertical support 71 which is entered into the vertical support 7 may be added to the vertical support 7. The vertical support 7 adjusts the lens plate 9 vertically, and then is fixed by a vertical position adjusting device 7a.

The lens plate 9, in which an interval between the centers of the left and right lenses 10, 11 is set to 63 to 65 mm which are intervals between the left and right eyes of a person, is provided at the lower end of the vertical support 7. In this case, an adjustment device (not shown) to adjust the interval between the left and right lenses 10, 11 within the range of 63 to 65 mm may be added to the lens plate 9.

The lens plate 9 is divided into two parts and the center thereof is coupled to the vertical support 4 so that the left and right lenses 10, 11 may be folded by the hinge (not shown), and thus is easy to store and carry.

As shown in FIGS. 1 to 3, a fixing means such as the fixing board 1 for mounting the main structures such as the lens plate 9 and the horizontal support 4 is provided on the upper end or one side of left and right of the video monitor 100 such as tablet PC or a computer monitor.

When the horizontal support 4 is unfolded in the front space of the video monitor 100, the length D of the horizontal support 4 is configured to be the same as the focal distance A between the left and right lenses 10, 11, as shown in FIG. 2. That is, as shown in FIG. 2, the total length B of the horizontal support 4 is the sum B of the interval D between the vertical support 7 and the video monitor 100 and the interval C between the video monitor and the fixing board 1. However, even in any case, the interval D between the vertical support 7 and the video monitor 100 needs to be the same as the focal distance A between the left and right lenses 10, 11 in order to view 3D videos without adjusting the focal distance of the lenses separately.

FIGS. 4A, 4B, and 4C are explanatory views showing the states in the order that the present invention is folded by the first and the second hinges 2, 5.

The horizontal support 4 is coupled to the upper end of the fixing board 1 by a rotating means such as the first hinge 2 to be rotatable to 180° in the horizontal direction, to 90° in the rear direction, and up to a total of 270°. However, a horizontal holding means such as the horizontal holder 3 is provided so that the video monitor 100 and the horizontal support 4 are perpendicular to each other.

A rotating means such as the second hinge 5 is provided at the front end of the horizontal support 4 so that the horizontal support 4 is rotatable to 180° in the vertical direction, to 90° in the rear direction of the horizontal support 4, and up to a total of 270°.

The right angle holder 6 is provided at the front end of the horizontal support 4 so that that the vertical support 7 is perpendicular to the horizontal support 4 when rotated in the vertical direction.

According to the present invention described above, the lens plate 9 is positioned in the front surface and used for VR video education as shown in FIG. 4A, and the lens plate 9 and the vertical support 7 are rotated upward by 270° to be folded, and may be folded with the horizontal support 4 to open the front surface of the video monitor 100 as shown in FIG. 4B.

When carrying, the horizontal support 4, to which the lens plate 9 and the vertical support 7 are folded, is rotated by 270° in the rear direction of the video monitor 100 so that the entire structure may be transformed to a thin film form, and then stored in a portable state, as shown in FIG. 4C.

In other words, the lens plate 9 rotates by 270° at the second hinge 5, by 90° again at the first hinge, and thus rotates by a total of 360° toward the rear end of the video monitor 100.

If necessary, the fixing board 1 may be separated from the video monitor 100 to be separately separated, carried, and stored.

According to the present invention described above, as shown in FIG. 4A, the horizontal support 4 is perpendicular with respect to the video monitor 100 by the first hinge 2 and the horizontal holder 3, and the vertical support 7 is perpendicular with respect to the horizontal support 4 by the second hinge 5 and the right angle holder 6, so that the image of the video monitor 100 and the left and right lenses 10, 11 are kept in parallel at the interval of the focal length A, and correspond to the focal point.

The present invention includes a pedestal 102 which is provided at the rear lower end of the video monitor 100 to stand the video monitor 100, and a foldable video monitor which is expandable to twice the size of the screen by unfolding the foldable video monitor 100 as necessary.

The fixing board 1 according to the present invention may be provided in a variety of structures for fixing and separating the video monitor 100 such as a tablet PC.

For example, the fixing board 1 may be configured in the form of clip, fastener, spring or the like, and may be configured in plurality as shown in FIGS. 2 and 3.

As shown in FIGS. 2 to 4, the first and the second hinges 2, 5 may be configured in various forms having a rotation range up to 270°, respectively.

The shape of the horizontal support 3 and the right angle holder 6 is also configured so that an internal angle thereof can maintain a right angle, but is not particularly limited in the present invention.

FIG. 5 is an explanatory view showing the component of the horizontal holder 3 in which the horizontal moving groove 3b is provided.

As the horizontal support 4 moves horizontally by the horizontal moving means 3a, the lens plate 9 moves horizontally, and moves vertically by the vertical support 7.

That is, as shown in FIG. 1, even if the 3D video or the VR video 101 is displayed on any position of the video monitor 100, the lens plate 9 moves up, down, left, and right so that the lens plate 9 can move to the position where the 3D video 101 is located.

Forming the horizontal moving groove 3b in a part of the lens plate 9 as shown in FIG. 6 is useful at the video monitors 100 of 8" to 10" which are relatively small.

According to the present invention, the lens plate 9 may move up, down, left, and right in a state that the focal distance is maintained by the horizontal support 4 in a space where the focal distance is maintained on the front surface of the video monitor 100.

The present invention may also include the video monitor 100.

Figure 7A:
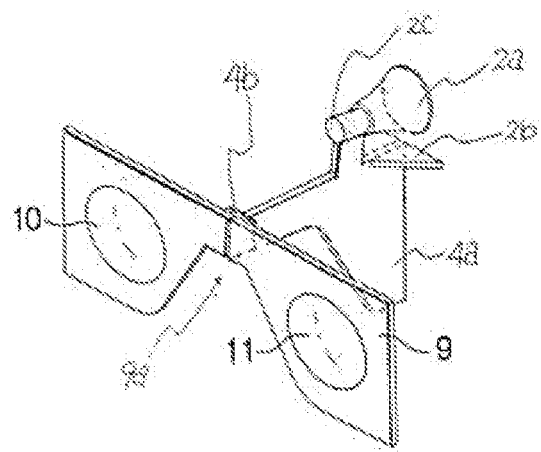
FIG. 7A is an explanatory view of an embodiment of the present invention.

According to the present invention, as shown in FIG. 7A, a center board 4a having the same length as the focal distance between the left and right lenses 11, instead of the horizontal support 4, is provided at the rear surface of the lens plate 9, a horizontal supporting board 2b is provided at the rear end of the center board 4a in the vertical direction, and an absorption plate 2a formed of elastic materials such as rubber, urethane, and silicon is fixed to a fixing board 2c at the rear upper end of the center board (4a).

The total length of the center board 4a and the horizontal support 4 needs to be the same as the focal distance between the left and right lenses 10, 11 in order to view images without adjusting the focal distance of the lenses separately.

In the structure as shown in FIG. 7A, the VR video 101 displayed on the video monitor 100 is horizontal with the VR video 101 with respect to the horizontal supporting board 2b, and the center board 4a is vertical to the center of the VR video 101, and then when the absorption plate 2a is pressed against the surface of the video monitor 100, the lens plate 9 is attached to the surface of the video monitor 100 while being in a vacuum state by the elasticity of the absorption plate 2a.

In this structure, when the position where the VR video 101 and the 3D video are displayed is changed, the absorption plate 2a may be detached from the video monitor 100 and reattached to the changed position as described above.

Since the lens plate 9 is firmly attached by the absorption plate 2a, the VR video 101 can be viewed while rotating it in the rotation direction of the viewing angle, and the image of any part of the video monitor 100 can also be viewed while moving freely.

The lens plate 9 may be divided into the left and right lens plates so that the left and right lens plates are unfolded when used, and folded when carrying by the hinge 4b.

The absorption plate 2a may be multiple pieces in small size. For example, two absorption plates may be provided at the upper and lower portions of the center board 4a or at the left and right ends of the horizontal supporting board 2a, respectively.

As shown in FIG. 7A, when used, the left and right lenses 9, 10 are in close contact to the left and right eyes of the user and the user's nose is entered into the lower end of the center of the lens plate 9 or the front part of the center board 4a.

The rear end of the horizontal supporting board 2b and the vertical supporting board 4, that is, the portion contacting the video monitor 100 may be made of elastic materials to prevent sliding.

Figure 7B:
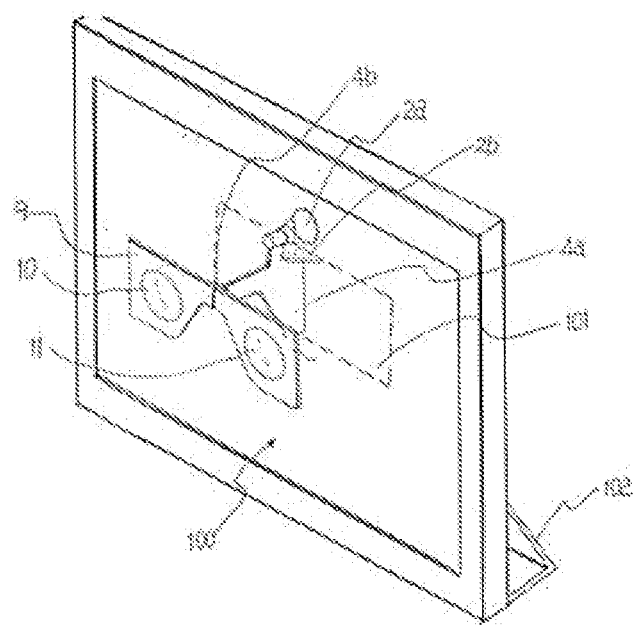
FIG. 7B is an explanatory view showing a state that FIG. 7(a) of the present invention is implemented.

As described above, the present invention is simple to use and store in a state of being combined with an existing video monitor 100 such as a tablet PC as shown in FIGS. 1, 4, and 7B, and has a great educational effect since it is possible to select and educate the 3D video and the 3D-based VR video at any time by coupling the present invention to the existing video monitors with 8" or larger sized screen exceeding 65 mm, the interval between the left and right pupils of a person, which were distributed to schools.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A virtual reality video device for an educational video monitor, said video monitor having a 8" or larger screen size configured to provide 3D videos and VR videos, said virtual reality video device comprising:
   a center board having a length;
   a lens plate provided on a first end of the center board along the length of the center board so that, when the virtual reality video device is in a use position, the lens plate is provided in a space in front of a front surface of the video monitor;
   left and right lenses provided in the lens plate;
   an absorption plate provided on a second end along the length of the center board configured to attach to the front surface of the video monitor, said second end comprising an upper part connected to the absorption plate;
   wherein the center board has a length that corresponds to a focal distance of the left and right lenses, when in the use position.

2. The virtual reality video device for educational video monitor according to claim 1, wherein a horizontal moving groove is further provided on a rear surface of the lens plate so that the lens plate is configured to move horizontally with respect to the front surface of the video monitor.

3. The virtual reality video device for educational video monitor according to claim 2, wherein a right angle holding means is further provided at at least one end of the center board.

4. The virtual reality video device for educational video monitor according to claim 2, wherein a rotating means is further provided at at least one end of the center board.

5. The virtual reality video device for educational video monitor according to claim 1, wherein a video monitor is further provided.

6. The virtual reality video device for education video monitor according to claim 1, wherein the lens plate is attached to the center hinge via a hinge.

7. The virtual reality video device for education video monitor according to claim 1, wherein the center board comprises a fixing board forming the upper part of the second end, and said absorption plate is connected to the fixing board.

8. The virtual reality video device for education video monitor according to claim 1, wherein the center board has a height along the second end, and wherein along said height, a horizontal supporting board is provided.

* * * * *